(No Model.)
J. B. & D. L. SPEICHER.
MEANS FOR AUTOMATICALLY SUPPLYING WATERING TROUGHS.
No. 367,456. Patented Aug. 2, 1887.
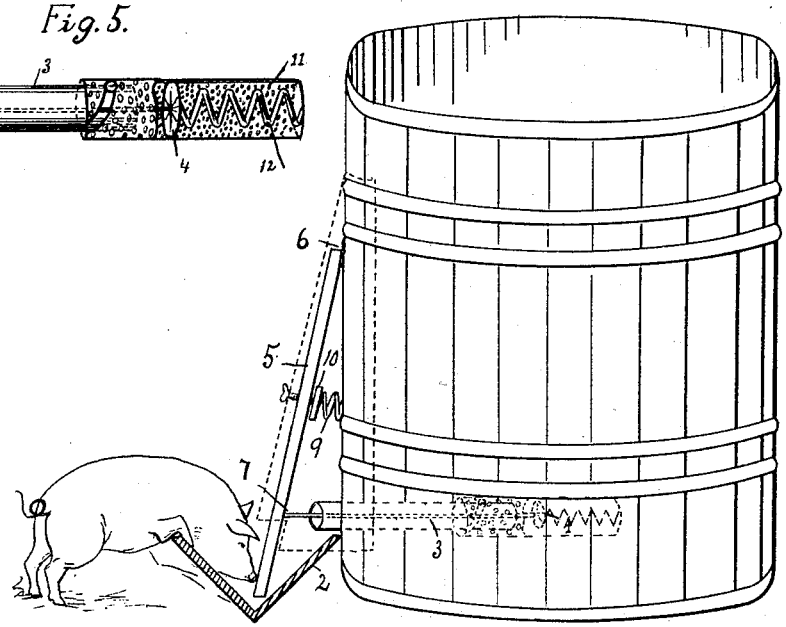
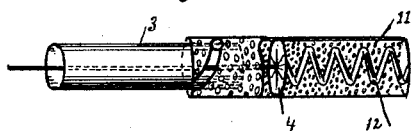
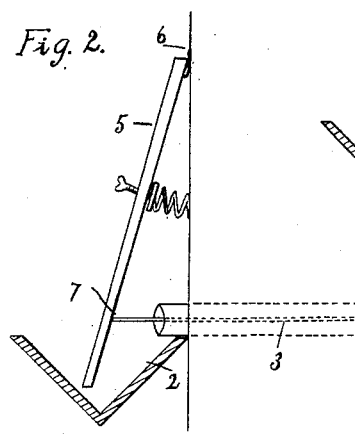
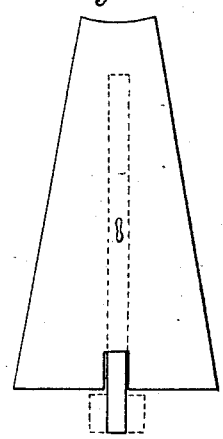
Witnesses
Geo. H. Cooper Jr.
Florence Davis
Inventors
Joseph B. Speicher
Daniel L. Speicher
By their Attorney
Benj. R. Catlin

UNITED STATES PATENT OFFICE.

JOSEPH B. SPEICHER AND DANIEL L. SPEICHER, OF WABASH, INDIANA.

MEANS FOR AUTOMATICALLY SUPPLYING WATERING-TROUGHS.

SPECIFICATION forming part of Letters Patent No. 367,456, dated August 2, 1887.

Application filed March 8, 1887. Serial No. 230,142. (No model.)

*To all whom it may concern:*

Be it known that we, JOSEPH B. SPEICHER and DANIEL L. SPEICHER, citizens of the United States, residing at Wabash, in the county of Wabash and State of Indiana, have invented certain new and useful Improvements in Means for Automatically Supplying Watering-Troughs; and we do hereby declare the following to be a full, clear, and exact description of the invention, such as will enable others skilled in the art to which it appertains to make and use the same.

The invention relates to watering-troughs and means for automatically supplying them with water; and it consists in the matters hereinafter described, and particularly pointed out in the claims.

In the use of automatically-supplied troughs it has been found where mixed stock, or stock embracing animals of various weights and sizes, have been confined together, that the smaller animals are unable to obtain sufficient water because they cannot operate the water-supply valve, which in many cases is only adapted to be moved by an animal of large size and weight.

Our invention is adapted to remedy such an evil, though its use is not limited to the case specified, as it is applicable wherever there is need of an easily-worked and convenient valve to be operated by stock during the act of drinking.

In the accompanying drawings, which form part of this specification, Figure 1 represents a side elevation of a trough, water-tank, outflow-pipe, and valve, and means for operating the valve, the trough being shown in cross-section and a part of the pipe and valve being indicated by dotted lines. Fig. 2 represents an elevation of the parts, the tank being omitted and the trough shown in cross-section. Fig. 3 represents a cross section of a trough having a depression in its bottom. Fig. 4 is a front view of the shield; and Fig. 5 is a detail, on a slightly-enlarged scale, of matter indicated in Fig. 1.

1 indicates a large tank, such as is customarily used and kept supplied with water by wind-driven pumps.

2 indicates a drinking-trough; 3, an outlet-pipe, which is normally closed by hydrostatic pressure on the valve 4.

The size and form of the tank-pipe and valve may be varied without departing from the invention. In cold climates the pipes should extend within the tank sufficiently far to avoid danger of the valves freezing to the pipe or the latter being closed at its inner end by ice. In some situations it may be desirable to insert the outlet-pipe through the bottom of the tank, the pipe being bent outside the tank to bring its delivery end into proper position relative to the trough. I propose, also, to cover the tank, or a part of it adjacent to the pipe, with paper or other non-conducting material, when necessary, to prevent freezing. The pipe should of course be connected in a water-tight manner with the wall of the tank, and preferably should not extend outward in such manner as to be liable to injury, one or two inches being generally sufficient.

5 indicates a lath or wooden strip secured, preferably, to the wall of the tank at 6. This connection may be a hinge or pivot, or if the piece 5 is sufficiently elastic it may be screwed or nailed to the tank. To this strip the valve-stem is hinged, pivoted, or otherwise fastened at 7, the strip or spring being suitably located for that purpose and extending down near the bottom of the trough, as shown.

The operation will be obvious from the above description. An animal—such as a pig—in attempting to drink any small quantity of water remaining in the trough, at the bottom of the rod or strip, will push it toward the tank, thus overcoming the hydrostatic pressure, and consequently the valve-stem and valve will be moved inwardly and the pipe opened for the discharge of water. The valve will of course be closed as soon as the external pressure of the animal's nose is removed.

If desired, a small depression, as indicated at 8, may be provided in the trough at the lower end of strip 5 to receive a remnant of water to attract to this spot thirsty animals. We may also incase this strip with a box, (indicated by dotted lines in Fig. 2 and shown in Fig. 4,) secured to the tank in such manner as to guard against its lateral displacement, and also aid in preventing the freezing of water in and about the pipe. The lower end of the strip may extend through a slot, as indicated, the walls of which will prevent its being moved sidewise, but will not interfere with motion to and from the tank. We may also introduce a spring between the strip and the tank, as indicated at 9, and combine with this spring a regulating-screw, whereby the spring may be adjusted so as to either oppose or co-operate with the hydrostatic pressure. Thus when the tank is full it may be desirable to expand the spring, so that it will tend to move the strip toward the tank, and when the water is low to compress the spring, so that it will aid in automatically closing the valve. Such action of the spring can be regulated by running the screw in or out and correspondingly moving the block 10, to which the outer end of the spring is secured, the other end being fastened to the tank. The lower end of the strip may be made wider than the body to present more surface for the nose of the animal to bear against, so as to require less time for animals to learn how to secure a supply of water. This wider part can be made of sufficient extent to be hinged at one end, preferably near an end of the trough, while the other part of the same extends along the trough to a considerable distance, so that it is not necessary that the animal should push immediately over or even near the strip, in order to operate the valve.

In Fig. 5 is represented a tube, 3, valve 4, and perforated tube-extension 11 and coiled spring 12, indicated by dotted lines in Fig. 1. One end of this spring is secured to the outer end of the perforated tube on the inside, and the other to the valve, as indicated, and its tension is such that it tends to close the valve, and will do so with little or no aid from hydrostatic pressure on the valve. Water passes freely into the perforated tube, and escapes through pipe 3 whenever the valve is opened by pressure from without. The tube 11 is preferably made adjustable on the tube 3 in any well-known manner, as by screw-thread or bayonet-joint connections, whereby the tension of the spring can be varied.

It has heretofore been proposed to protect tanks against frost in various ways, and also to guard valve-operating mechanism, and we do not broadly claim such devices. It is a characteristic of our construction in this respect that the outlet and valve-operating mechanism are inclosed in a box or shield, which not only protects the mechanism located at the side of the tank against blows, but also tends to obviate danger of freezing. We are also aware that valves have been provided with springs tending to close them, and that such springs have been combined with means for regulating their tension, and also that tank-outlets have been covered with strainers. Our invention in this direction consists of the particular construction pointed out in combinations specified.

Having thus described our invention, what we desire to claim and secure by Letters Patent is—

1. The combination of the tank, outlet-pipe, valve and valve-stem, trough, strip, and shield or cover, as set forth, whereby the automatically-operating valve mechanism is protected and danger of freezing lessened.

2. The combination of the tank, the trough provided with a depression adjacent to the lower end of the strip and below the level of the main part of the bottom of the trough, the outlet, the valve and strip, and the spring for aiding the movement of the strip and valve, all substantially as set forth.

3. The combination of the tank, the outlet-pipe having a projection working in an inclined slot in a perforated extension, the perforated extension having the inclined slot, the valve, the valve-rod, and spring, all substantially as set forth, whereby the tension of the spring used to aid in closing the valve, when pressure is removed from the rod, can be varied by adjusting the extension.

In testimony whereof we affix our signatures in presence of two witnesses.

JOSEPH B. SPEICHER.
DANIEL L. SPEICHER.

Witnesses:
ISAAC E. GINGERICK,
WILLIAM H. BENT.